United States Patent [19]

Crouch et al.

[11] Patent Number: 4,732,517
[45] Date of Patent: Mar. 22, 1988

[54] ANTI-TAMPER FASTENER SHIELDING APPARATUS

[75] Inventors: Jack S. Crouch, Charlotte; Edward F. Zink, Matthews, both of N.C.

[73] Assignee: Carolina Moldings, Inc., Charlotte, N.C.

[21] Appl. No.: 806,756

[22] Filed: Dec. 9, 1985

Related U.S. Application Data

[63] Continuation-in-part of Ser. No. 555,033, Nov. 23, 1983, Pat. No. 4,621,230.

[51] Int. Cl.⁴ ............................................ F16B 31/02
[52] U.S. Cl. ...................................... 411/39; 411/10; 411/910
[58] Field of Search .......................... 411/371–378, 411/910, 911, 39, 8–14; 292/307 R, 307 B

[56] References Cited

U.S. PATENT DOCUMENTS

| | | | |
|---|---|---|---|
| 998,878 | 7/1911 | Dinsmoor . | |
| 1,186,760 | 6/1916 | Elliott | 292/307 B |
| 1,296,165 | 3/1919 | Costuma . | |
| 1,887,557 | 11/1932 | Keidel | 292/307 B |
| 2,033,371 | 3/1936 | Benaggio | 292/307 B |
| 2,081,627 | 5/1937 | Heinrich | 292/307 R X |
| 2,082,068 | 6/1937 | Lewis | 292/307 R X |
| 2,706,065 | 4/1955 | Stone . | |
| 3,065,662 | 11/1962 | Spoehr et al. . | |
| 3,122,051 | 2/1964 | Greene | 411/373 |
| 3,174,383 | 3/1965 | Heil . | |
| 3,285,120 | 11/1966 | Kartiala | 411/8 |
| 3,298,272 | 1/1967 | Henderson . | |
| 3,385,466 | 5/1968 | Hook et al. | 220/307 |
| 3,492,841 | 2/1970 | Ipri . | |
| 3,734,579 | 5/1973 | Schumacher | 308/20 |
| 3,885,492 | 5/1975 | Gutshall | 411/373 |
| 4,018,111 | 4/1977 | Goldhaber | 81/71 |
| 4,037,515 | 7/1977 | Kessel | 85/61 |
| 4,065,946 | 1/1978 | Loynes et al. | 70/58 |
| 4,214,505 | 7/1980 | Aimar | 85/55 |
| 4,225,165 | 9/1980 | Kesselman | 411/910 X |
| 4,324,516 | 4/1982 | Sain et al. | 411/5 |
| 4,611,379 | 9/1986 | Heitzman | 411/572 |

FOREIGN PATENT DOCUMENTS

| | | |
|---|---|---|
| 133456 | 7/1949 | Australia . |
| 2239146 | 2/1975 | France . |
| 285825 | 1/1953 | Switzerland . |
| 1438171 | 6/1976 | United Kingdom . |

Primary Examiner—Carl D. Friedman
Attorney, Agent, or Firm—Shefte, Pinckney & Sawyer

[57] ABSTRACT

Apparatus for assembly with a bolt or screw upon installation thereof to prevent tampering therewith, including a one piece collar device having an outer annular jacket member with a restricted collar portion and an inner annular washer member detachably joined to the jacket member at the collar portion by a frangible diaphragm. The stem of a bolt or screw is inserted through the collar device and tightened into engagement with the collar portion to cause shearing of the diaphragm to separate the washer and jacket members, the washer member being of a larger axial dimension and smaller radial dimension than the collar portion to permit the jacket member to rotate freely about the bolt or screw and the washer member when the enlarged fastener head is tightened into clamping engagement with the washer member. A cap member fits snugly in the free end of the jacket member to enclose the fastener head. Thus, the fastener head cannot be frictionally clamped by gripping the exterior of the rotatable jacket member to deter tampering with the fastener.

9 Claims, 5 Drawing Figures

ANTI-TAMPER FASTENER SHIELDING APPARATUS

CROSS-REFERENCE TO RELATED APPLICATIONS

This is a continuation-in-part of copending U.S. patent application Ser. No. 555,033, filed Nov. 23, 1983, entitled ANTI-TAMPER FASTENER SHIELDING DEVICE now U.S. Pat. No. 4,621,230.

BACKGROUND OF THE INVENTION

The present invention relates to devices for shielding bolts, screws and like fasteners from unauthorized access thereto to deter and enable detection of tampering therewith.

Because of the virtually universal use of bolts, screws and the like for all types of fastening uses and the wide availability of wrenches and similar tools adapted for affixation and removal thereof, unauthorized tampering with exposed bolts and screws, particularly in public areas, is a significant, ongoing problem, resulting each year in substantial losses due to theft, vandalism, damage and the like. As only one example of this constantly increasing problem, public utility companies are increasingly experiencing losses due to tampering with usage meters accomplished by the ready removal of the meter cover or other shroud by simple and easy loosening and removal of the retaining bolts or screws. Similarly, vending machines are commonly vandalized by unauthorized tampering with bolts and screws employed in the construction thereof. Many other examples of this problem too numerous to list herein exist.

While careful design engineering enables the minimization of exteriorly accessible bolts and screws in machinery and devices in which unauthorized tampering may be a problem, this solution is not always feasible and, in any event, it is nevertheless inevitable that at least some bolts and screws will be accessible to unauthorized tampering. In the past, various types of covers, caps, plugs and the like have been developed for shrouding otherwise accessible bolts and screws to prevent unauthorized access thereto. Examples of such devices are disclosed in U.S. Pat. Nos. 1,296,165; 3,065,662; 3,174,383; 3,298,272; and 3,492,841. However, it is not believed that such devices have ever been widely accepted and come into common use, presumably because such devices are susceptible to disassembly or other contravention without considerable difficulty.

One such device which has achieved some degree of use is the GUARD-NUT brand device marketed by Rally Enterprises, Inc., of Mill Valley, Calif. The GUARD-NUT device is particularly designed for use in conjunction with bolts used on utility meter devices and basically provides a bolt having a breakaway head adapted to be sheared off the bolt stem upon tightening to a predetermined degree of torque and a sleeve adapted to encircle the remaining end portion of the bolt to prevent access thereto. This device, while effective to prevent tampering with the bolt, also essentially prevents authorized removal of the bolt since the remaining end portion thereof provides no means of accepting any type of common or special tool. Thus, to remove the bolt for authorized purposes, it is necessary to destroy it and its protective sleeve by cutting or drilling.

Many of the prior art anti-tamper devices utilize the shielded bolt or screw to retain the fastener cover or other shielding assembly in place, thereby producing an additional problem in that the shielded bolt or screw may be rotationally untightened and removed by gripping and rotating the fastener cover or other shielding assembly with pliers or a similar conventional tool to frictionally transmit untightening rotation to the retaining head of the shielded bolt or screw. U.S. Pat. No. 4,324,516 discloses a fastener shielding assembly adapted to be mounted rotatably on the lug nut of an automobile wheel so that the shielding assembly cannot be utilized to manipulate the lug nut without breaking the shielding assembly. This device, however, suffers the disadvantage that it is particularly adapted prinipally to use for automobile wheel lug nuts and is not universally adaptable for all sorts of screws, bolts and like fasteners having a stem and an enlarged head. Furthermore, this device suffers the same disadvantage as the above-described GUARD-NUT device in that it must be destroyed in order to remove the shileded lug nut. The aforementioned copending parent application hereto, as well as U.S. Pat. No. 4,065,946, disclose the use of fastener shielding devices in combination with conventional shoulder-type screws or bolts to similarly permit the cover or shielding assembly to rotate about the shielded shoulder bolt or screw to prevent removal rotation of the shielded bolt or screw by clamping action on the cover or shielding assembly. While this type of device provides a simple and reliable arrangement for deterring access to the shielded bolt or screw, these devices also disadvantageously are not universally applicable in that they are ineffective for shielding other conventional bolts, screws and like fasteners which do not have a special shoulder portion and furthermore can be more expensive due to the normally considerably higher cost of special shoulder bolts and screws.

In contrast, the present invention provides a novel apparatus adapted for use universally with all types of conventional bolts, screws and like fasteners of the type having a stem and an enlarged head for shielding the securing head of the fastener to prevent unauthorized access thereto without detectably damaging the components of the apparatus, whereby access to the fastener is substantially deterred on one hand and, in the event tampering occurs, is susceptible of ready detection on the other hand, while the apparatus is also adapted for easy disassembly without total destruction of the apparatus to permit ready access to the fastener head for authorized removal when desired.

SUMMARY OF THE INVENTION

Briefly described, the fastener shielding apparatus of the present invention includes an annular collar device for extension therethrough of the fastener stem and for disposition adjacent the underside of the fastener head in assembly with the fastener and a closure member adapted to mate with the collar device for cooperatively enclosing the fastener head to deter access thereto. The collar device basically includes an outer annular collar member, an inner annular washer member, and a frangible connecting member connecting the collar member and the washer member and adapted to break to detach them from one another under the force of engagement of the fastener head with the collar device upon installation of the fastener in assembly therewith. The washer member is of a greater axial dimension than the collar member for installed engagement of the fastener head with the washer member to permit the collar member to rotate freely about the fastener and the washer member, thereby preventing removal action frictionally upon the fastener by action upon the collar member.

In the preferred embodiment of the fastener shielding apparatus, the collar device is integrally molded in one piece to include a jacket member having an annular housing portion having an opening therethrough for receiving the fastener head to be encircled by the housing portion, an annular collar portion constricting the opening for extension through the collar portion of the fastener stem and for disposition of the collar portion adjacent the underside of the fastener head, the annular washer member disposed coaxially with the collar portion at the axial side thereof opposite the housing portion for extension through the washer member of the fastener stem and for disposition of the washer member adjacent the underside of the fastener head, and a frangible annular diaphram member extending radially between the collar portion and the washer member. The washer member is of an outer diametric dimension smaller than the constricted opening through the collar portion and an axial dimension greater than the collar portion. The diaphragm member is adapted to be sheared under the force of engagement of the fastener head with the collar portion upon installation of the fastener to detach the jacket member and the washer member to dispose the washer member radially between the collar portion and the fastener stem for rigid clamping of the washer member by the fastener head while permitting the jacket member to rotate freely about the fastener and the washer member. The collar device is integrally molded of a material adapted to break readily in response to gripping force applied exteriorly to the housing portion in a manner tending to impose the removal action frictionally upon the fastener head, thereby to enable detection of tampering with the collar device. Preferably, for this purpose, the collar device is formed of an acrylic material. The closure member is a cap adapted to securely fit interiorly of the housing portion in flush relation therewith for enclosing the fastener head therewithin.

Preferably, the fastener shielding apparatus of the present invention is utilized for deterring and detecting tampering with a fastener utilized to hold in place a cover member protecting the usage measuring assembly in a conventional utility meter or the like, e.g., a natural gas utility meter, although as will be appreciated, the apparatus may be utilized in assembly with any fastener utilized to secure a structural member in desired place.

DESCRIPTION OF THE PREFERRED EMBODIMENT

Figure 1:
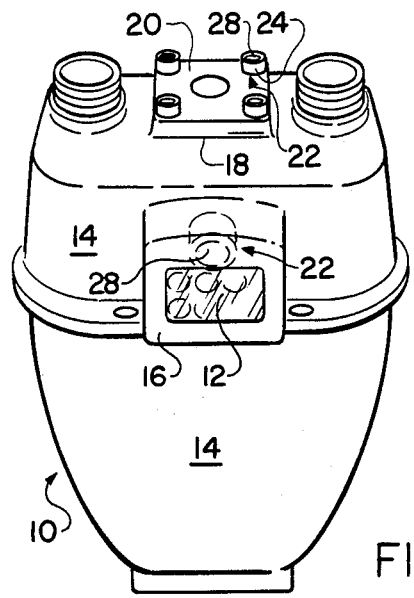
FIG. 1 is a perspective view of a representative utility usage meter device with which the anti-tamper fastener shielding apparatus of the present invention is employed in conjunction with securing bolts for cover plates of the meter.

Referring now to the accompanying drawings and initially to FIG. 1, there is indicated generally at 10 a conventional utility usage meter device of the type ordinarily employed by natural gas utility companies in the individual natural gas flow lines to each particular usage location or customer for monitoring the quantity of natural gas consumed at such location or by such customer. For this purpose, the meter device 10 is provided with an internal conduit and valve arrangement (not shown) with which a measuring device (also not shown) is operatively associated for measuring the quantity of natural gas flowing through the metering device and registering same by a dial assembly 12 mounted on the outer casing 14 of the meter device 10. A transparent cover plate 16 is bolted to the outer casing 14 of the meter device 10 over the dial assembly 12 to shield it from damage by weather or otherwise while permitting reading thereof. To permit access to the internal conduit and valve arrangement and other internal components of the meter device 10, an access opening 18 is provided in the top surface of the casing 14, over which access opening 18 a cover plate 20 is ordinarily bolted to the casing 14.

Over recent years, natural gas utility companies have increasingly experienced the problem of customers removing one or both of the cover plates 16,20 and tampering with one or both of the dial assembly 12 and the internal components of the meter device 10 in attempting to alter the readings of the dial assembly 12 to reflect a less than actual consumption of natural gas. As a solution to this problem, the present invention provides a novel apparatus indicated generally at 22 for enclosing and shielding the securing bolts of the cover plates 16,20 to prevent access thereto so that the cover plates 16,20 cannot be removed using ordinary tools.

Figure 2:
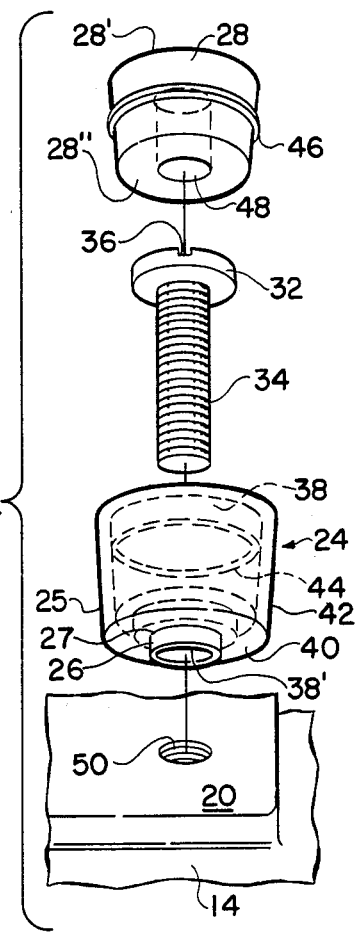
FIG. 2 is an exploded perspective view of the anti-tamper fastener shielding apparatus of FIG. 1.
Figure 4:
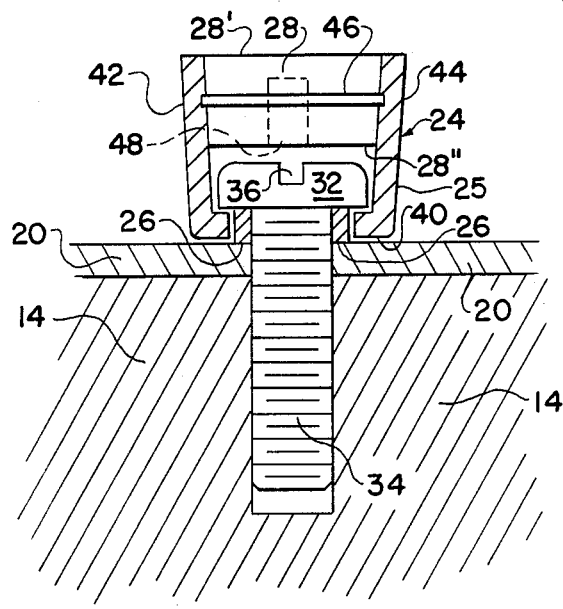
FIG. 4 is a vertical cross-sectional view of the anti-tamper apparatus of FIGS. 2 and 3 in assembled form.
Figure 3:
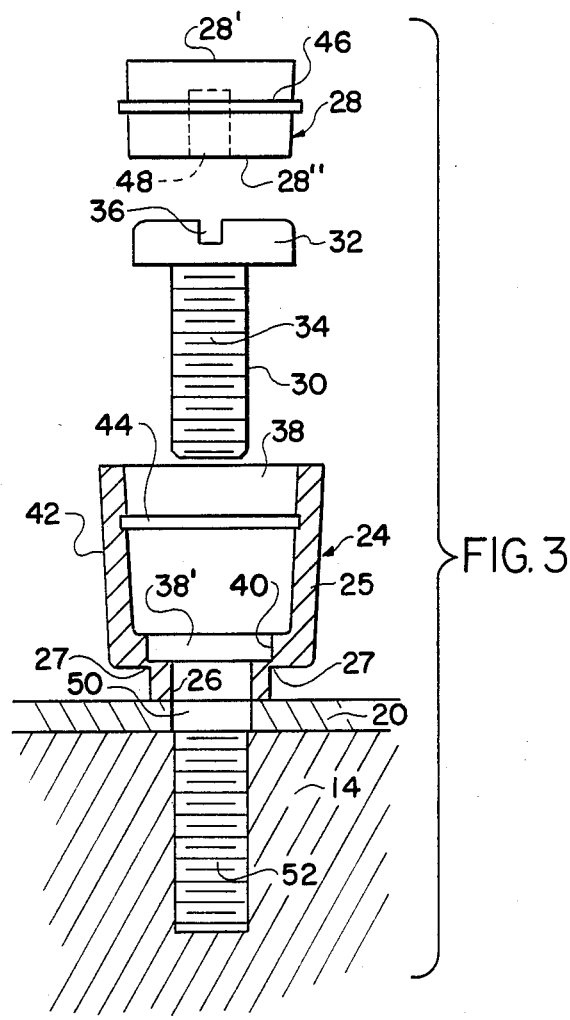
FIG. 3 is an exploded vertical cross-sectional view of the anti-tamper apparatus of FIG. 2 taken along line 2—2 thereof.

The anti-tamper apparatus 22 may best be seen in FIGS. 2-4 and basically includes a collar device 24 and a cap member 28 dimensioned and configured matingly for assembly with any conventional bolt, screw or similar fastener 30 in fastening use thereof for enclosing the fastener 30 to prevent access thereto. As will be understood, the fastener 30 is of the conventional type having an enlarged head 32 and a longitudinal stem 34 extending therefrom. In conventional manner, the head 32 is provided with a slot 36 or is formed of a geometric configuration to facilitate receipt of a screwdriver, wrench or other conventional tool for driving rotation of the fastener 30, and the stem 34 is threaded to facilitate penetrating engagement within a structure to which the fastener 30 is to be fastened.

Figure 3A:
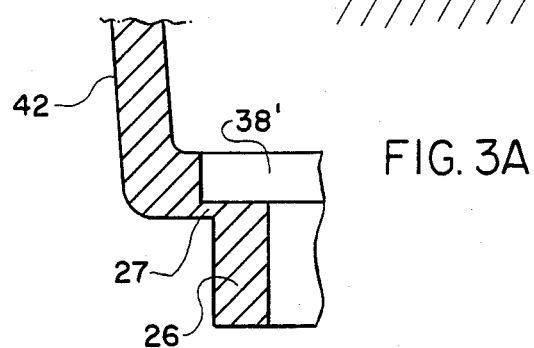
FIG. 3A is an enlarged vertical cross-sectional view of the diaphragm member of the collar device of the anti-tamper apparatus of FIG. 3.

The collar device 24 is integrally molded in one piece of a suitable plastic material to include a jacket member 25, a washer member 26, and a frangible connecting member 27 therebetween. The jacket member 25 is formed as a circular frustum having a corresponding circular opening 38 extending axially centrally therethrough. The jacket member 25 includes an annular collar portion 40 which extends radially inwardly from the end thereof having the smallest diameter thereby constricting the opening 38 at 38', with the body of the jacket member 25 forming an annular housing portion 42. The constricted opening 38' is of a diameter slightly smaller than the diameter of the enlarged head 32 of the fastener 30. The washer member 26 is formed as a cylindrical disk having an outer diameter slightly smaller than the diameter of the constricted opening 38', an inner diameter slightly greater than the diameter of the stem 34 of the fastener 30, and an axial length slightly greater than the axial thickness of the collar portion 40 of the jacket member 25. The washer member 26 is disposed coaxially with the opening 38 through the jacket member 25 at the axially outward side of the collar portion 40 opposite the housing portion 42 of the jacket member 25 with only a slight axial extent of the washer member 26 extending within the constricted opening 38' radially adjacent the collar portion 40. The frangible connecting member 27 is formed as a relatively thin annular web or diaphragm of the plastic material from which the material collar device 24 is molded, which diaphragm extends radially between the adjacent facing portions of the washer member 26 and the collar portion 40 of the jacket member 25. (See FIG. 3A). As will be more fully explained hereinafter, the frangible diaphragm 27 is thusly adapted to be readily sheared to detach the washer member 26 from the jacket member 25 in response to the application of a relatively small axial force to the jacket member 25 in the direction of the washer member 26 to permit the washer member 26 to be received within the constricted opening 38' for relative rotation of the jacket and washer members 25,26.

The jacket member 25 is formed of a frusto-conical exterior shape tapered slightly outwardly from the collar portion 40 to the opposite free end of the housing portion 42, and it central opening 38 is of a similar frusto-conical shape tapered slightly inwardly from the free end of the housing portion 42 toward the collar portion 40. Preferably, the taper of such exterior surface of the jacket member 25 is formed at approximately one and one-half degrees (1.5°) and the taper of such interior surface of the jacket member 25 is formed at approximately three degrees (3°) relative to the axis of the jacket member 25 to produce a slightly thicker cross-sectional dimension of the jacket member 25 in the region adjacent the collar portion 40. An annular recessed channel 44 of a rounded cross-sectional shape is formed circularly in the interior wall surface of the housing portion 42 coaxially therewith at a relatively small spacing from the free end of the housing portion 42 opposite its collar portion 40. The aforementioned corresponding frusto-conical shapes of the interior and exterior surfaces of the housing portion 42 will be understood to provide a uniform cross-sectional thickness to the housing portion 42 and permit easy release of the jacket member 26 from a forming mold. Preferably, the jacket member 25 is molded of a conventional thermoplastic polymeric material curable to a relatively hard and brittle condition having only a small degree of resiliency, sufficient thereby to permit ejection from a forming mold and to permit a small degree of resilient radially outward flexure of the housing portion 42 of the jacket member 25 while being adapted to break and shatter the housing portion 42 upon the application of any significant degree of clamping or other compressive force applied radially inwardly to the housing portion 42, for purposes hereinafter more fully described. It has been found that an acrylic injection molding resin, such as the resin material manufactured by Rohn & Haas Co., of Philadelphia, Pa, under the designation VO52 grade, or another thermoplastic material having equivalent hardness, tensile elongation and other relevant properties, best provides these desired characteristics when cured.

The cap member 28 is also of a frusto-conical shape, having a diameter at its largest radial face 28' slightly greater than the largest diameter of the opening 38 of the jacket member 25 at the outer free end of its housing portion 42 and tapering longitudinally therefrom at an angle slightly smaller than the taper angle of the interior wall surface of the housing portion 42 defining the opening 38, preferably at approximately two and one-half degrees (2.5°) to the axis of the cap member 28. A projecting annular rib 46 of a substantially square cross-sectional shape is formed on the outer annular periphery of the cap member 28 coaxially therewith at a distance from the larger end 28' of the cap member 28 equal to the distance by which the channel 44 of the jacket member 25 is spaced from the outer free end of its housing portion 42, and the annular rib 46 extends outwardly from the peripheral surface of the cap member 28 to a diameter slightly greater than the diameter of the radial face 28'. A cylindrical opening 48 extends axially through the center of the cap member 28 from its radial face 28'' at its smaller end to a substantial depth, preferably more than 75% of the axial length of the cap member 28. Preferably, the cap member 28 is molded of a conventional thermoplastic polymeric material curable to a relatively hard but more resilient condition than the collar device 24, e.g., of nylon injection molding resin.

In use of the present anti-tamper apparatus 22, the collar device 24 is first assembled with the fastener 30 by insertion of the fastener stem 34 through the opening 38 at the free outer end of the housing portion 42 and then through the constricted opening 38' of the collar portion 40 until the enlarged head 32 of the fastener 30 is positioned with its underside resting against the inner radial surface of the collar portion 40. The fastener 30 is then installed in its usual maner in a threaded or other appropriate receiving opening, e.g., aligned openings 50,52 formed in the cover plate 20 and tapped in the outer casing 14 of the meter device 10 about the access opening 18 or, similarly, aligned openings formed in the cover plate 16 and tapped in the outer casing 14 of the meter device 10 about the dial assembly 12. As the fastener 30 is tightened into its desired installed disposition, the enlarged head 32 engages the inner radial surface of the collar portion 40 of the jacket member 25 and, upon further tightening of the fastener 30, applies sufficient force to the collar portion 40 and, in turn, to the frangible diaphragm 27 to cause the diaphragm 27 to shear to detach the jacket and washer members 25,26 from one another and to force the jacket member 25 away from the enlarged head 32 to receive the washer member 26 within the constricted opening 38' radially adjacent the collar portion 40. Upon final tightening of the fastener 30 into its desired installed disposition, the enlarged head 32 engages the facing radial end surface of the washer member 26 and fixedly clamps the washer member 26 between the underside of the enlarged fastener head 32 and the adjacent structural member, e.g., the cover plates 16,20, being fastened in place by the fastener 30. Notably, however, because of the aforedescribed axial and diametric dimensional differences between the washer member 26 and the collar portion 40 of the jacket member 25, the enlarged head 32 of the fastener 30 is prevented from also clamping the collar portion 40 of the jacket member 25 rigidly in place and instead the jacket member 25 is permitted sufficient freedom to rotate by its collar portion 40 about the washer member 26 and the fastener 30. Thus, there is prevented the possibility of rotational untightening and removal of the fastener 30 through frictional transmittal to the fastener head 32 of action thereon by clamping engagement of the outer periphery of the jacket member 25 utilizing pliers, a wrench or other conventional tool, which would be possible and would enable circumvention of the present anti-tamper apparatus if the fastener 30 were utilized to clamp the jacket member 25 in place. Furthermore, because of the relatively brittle nature of the jacket member 25 resulting from the particular acrylic resin material utilized, the jacket member 25 is not susceptible of sufficient radially inward resiliency to permit frictional gripping of the fastener head 32 by such clamping engagement of the outer periphery of the jacket member 25, but instead any such clamping action thereon would result in shattering of the jacket member 25 to readily indicate that tampering with the anti-tamper apparatus 22 had occurred.

Following the installation and tightening of the fastener 30, the cap member 28 is assembled with the jacket member 25 by insertion of the smaller end 28' of the cap member 28 into the opening 38 in the free outer end of the jacket member 25 and then driving the cap member 28 into the opening 38 with a hammer or other blunt instrument until the cap member 28 is flush with the outer edge of the housing portion 42 of the jacket member 25. At this process of assembly is effected, the limited degree of resiliency of the material from which the jacket member 25 is formed and the greater resiliency of the material from which the cap member 28 is formed cooperatively permit the housing portion 42 of the jacket member 25 to flexibly expand outwardly and the cap member 28 to be compressingly deformed inwardly to compensate for the greater diametric dimensions of the cap member 28 and its rib 46, thereby permitting passage of the cap member 28 into the opening 38. When the cap member 28 is brought flush with the outer edge of the housing portion 42, the rib 46 of the cap member 28 becomes seated in the channel 44 of the jacket member 25 by a snap-fit effected by a partial release of the spring tension loaded in the jacket and cap members 25,28 under their aforedescribed flexure. Notably, the difference in the shapes of the square rib 46 and the rounded channel 44 serve to effect an interference fit therebetween which maintains a certain degree of resilient spring tension between the cap member 28 and the housing portion 42 greater than would occur if the rib 46 and channel 44 were of conforming shapes. Furthermore, the greater diametric dimensions of the cap member 28 than the opening 38 of the housing portion 42 at the location of their surface engagement and the smaller tapering angle of the outer peripheral surface of the cap member 28 as compared to the tapering angle of the interior wall surface of the housing portion 42 effect a supplementary resilient frictional interference fit between the outer annular surface of the cap member 28 and the interior wall surface of the housing portion 42. As will be understood, other cross-sectional configurations of the rib 46 and the channel 44 and other tapering angles of the outer surface of the cap member 28 and the inner wall surface of the housing portion 42 may be equally well employed without departing from the substance or scope of the present invention. In this manner, the cap member 28 is securely fitted matingly with the jacket member 25 to enclose entirely the head 32 of the fastener 30 and to shield it from access thereto. The flush relative condition of the jacket and cap members 25,28 together with the relatively smooth and rounded exterior surfaces thereof provide no ready manner of disassembly of the jacket and cap members 25,28 without destroying or at least damaging one or both thereof to an extent that would be readily detectable. In fact, extraction of the cap member 28 from the jacket member 25 requires a considerable pulling force exerted axially of the cap member 28 and the opening 38 whereby unauthorized disassembly of the jacket and cap members 25,28 is extremely difficult. Furthermore, as previously indicated, the facility of the jacket member 25 for rotation about the washer member 26 and the fastener 30 prevents unauthorized untightening action on the fastener 30 by friction upon rotation of the jacket member 25. To enhance the noticeability of tampering with the present anti-tamper apparatus, it is contemplated that the cap member 28 may be formed of a different, relatively bold color from the jacket member 25 to make relatively noticeable its absence when removed. The recessed cylindrical opening 48 in the radial face 28" of the cap member 28 facilitates authorized removal of the cap member 28 for access to the fastener 30 by insertion of a removal tool axially centrally through the outer radial face 28' of the cap member 28, as more fully described in the aforementioned copending parent application hereto.

In summary, the apparatus of the present invention will be understood to provide several important advantages. First and most apparent, the present apparatus is effective to completely enclose the operating head of a bolt or other fastener to shield it from access and therefore to prevent unauthorized removal thereof or tampering therewith. The snap connection between the jacket and cap members of the present apparatus is a substantially strong one employing an interference fit utilizing both spring and frictional forces rendering it virtually impossible to separate the members using ordinary conventional tools without damaging or destroying the members. Furthermore, the construction of the jacket and cap members is particularly designed to facilitate easy molding thereof of conventional material, making the present apparatus relatively inexpensive to produce.

Those persons skilled in the art will understand that the present apparatus is of a substantially broad utility susceptible of use in virtually any embodiment wherein it is desirable to shield a bolt, screw or other fastener from unauthorized access. Accordingly, while the present apparatus has been disclosed as preferably embodied for use with utility usage meter devices, it is to be understood that the present invention is not limited thereto, the present disclosure of the preferred embodiment of the present invention being made solely for illustrative purposes in providing an enabling disclosure to the skill of the art. Furthermore, it will be understood that variations or modifications may be made in the construction of the members of the present apparatus as previously indicated without departing from the substance or scope of the present invention. All modifications, variations, adaptations, and equivalent arrangements of the present apparatus which would be reasonably apparent from the foregoing disclosure are considered to be within the scope and substance of the present invention which is to be limited only by the claims appended hereto.

We claim:

1. Apparatus for assembly with a fastener of the type having a stem and an enlarged head during use of said fastener for deterring and detecting tampering therewith, said apparatus comprising annular collar means for extension therethrough of said fastener stem and for disposition adjacent the underside of said fastener head in assembly with said fastener and closure means adapted to mate with said collar means for cooperatively enclosing said fastener head to deter access thereto, said collar means including an outer annular collar member having an annular collar portion, an inner annular washer member, and frangible means connecting said collar member and said washer member and adapted to break to detach said collar member and said washer member from one another under force of engagement of said fastener head with said collar means upon installation of said fastener in assembly with said collar means, said washer member being of a greater axial dimension than said collar portion for installed engagement of said fastener head with said washer member to permit said collar member to rotate freely about said fastener and said washer member, thereby preventing removal action frictionally upon said fastener by action upon said collar member.

2. Apparatus according to claim 1 and characterized further in that said collar member is formed of a material adapted to break readily in response to gripping force applied exteriorly thereto tending to impose removal action frictionally upon said fastener head, thereby to enable detection of tampering with said collar means.

3. Apparatus according to claim 2 and characterized further in that said collar member is formed of acrylic material.

4. Apparatus according to claim 1 and characterized further in that said washer member is disposed at one axial side of said collar member and said frangible means extends generally radially therebetween for shearing of said frangible means under said force of engagement of said fastener head with one of said collar member or said washer member.

5. Apparatus according to claim 4 and characterized further in that said washer member and said collar member are disposed coaxially with one another, the outer diametric dimension of said washer member being less than the inner diametric dimension of said collar member, and said frangible means comprising an annular diaphragm member extending radially between said collar member and said washer member.

6. Apparatus according to claim 5 and characterized further in that said collar member comprises said annular collar portion adapted to be disposed adjacent the underside of said fastener head in assembly with said fastener and an annular housing portion extending axially from said collar portion for receiving and encircling said fastener head, said closure means being adapted to fit interiorly of said housing portion to enclose said fastener head therewithin.

7. Apparatus according to claim 6 and characterized further in that said collar member is formed of a material adapted to break readily in response to gripping force applied exteriorly thereto tending to impose removal action frictionally upon said fastener head, thereby to enable detection of tampering with said collar means.

8. Apparatus for assembly with a screw of bolt-type fastener having a mounting stem and an enlarged head during use of said fastener for deterring and detecting tampering therewith, said apparatus comprising a one-piece integrally molded annular collar means for extension therethrough of said fastener stem and for retained disposition adjacent the underside of said fastener head in assembly with said fastener and closure means adapted to mate with said collar means for cooperatively enclosing said fastener head to deter access thereto, said collar means comprising a jacket member having an annular housing portion having an opening therethrough for receiving said fastener head to be encircled by said housing portion and an annular collar portion constricting said opening for extension through said collar portion of said fastener stem and for disposition of said collar portion adjacent the underside of said fastener head, an annular washer member of an outer diametric dimension smaller than said constricted opening through said collar portion and an axial dimension greater than said collar portion, said washer member being disposed coaxially with said collar portion at the axial side thereof opposite said housing portion for extension through said washer member of said fastener stem and for disposition of said washer member adjacent the underside of said fastener head, and a frangible annular diaphragm member extending radially between said collar portion and said washer member, said diaphragm member being adapted to be sheared under force of engagement of said fastener head with said collar portion upon installation of said fastener in assembly with said collar means to detach said jacket member and said washer member to dispose said washer member radially between said collar portion and said fastener stem for rigid clamping of said washer member by said fastener head while permitting said jacket member to rotate freely about said fastener and said washer member, thereby preventing removal action frictionally upon said fastener by action upon said jacket member, said collar means being integrally molded of a material adapted to break readily in response to gripping force applied exteriorly to said housing portion thereof tending to impose said removal action frictionally upon said fastener head, thereby to enable detection of tampering with said collar means, and said closure means comprising a cap member adapted to securely fit interiorly of said housing portion in flush relation therewith for enclosing said fastener head therewithin.

9. In combination with a utility meter or the like having a usage measuring assembly, a cover member for protection of said measuring assemby, and a fastener of the type having a stem and an enlarged head holding said cover member in place, the improvement comprising apparatus for assembly with said fastener for deterring and detecting tampering therewith, said apparatus comprising annular collar means for extension therethrough of said fastener stem and for disposition adjacent the underside of said fastener head in assembly with said fastener and closure means adapted to mate with said collar means for cooperatively enclosing said fastener head to deter access thereto, said collar means including an outer annular collar member having an annular collar portion, an inner annular washer member, and frangible means connecting said collar member and said washer member and adapted to break to detach said collar member and said washer member from one another under force of engagement of said fastener head with said collar means upon installation of said fastener in assembly with said collar means, said washer member being of a greater axial dimension than said collar portion for installed engagement of said fastener head with said washer member to permit said collar member to rotate freely about said fastener and said washer member, thereby preventing removal action frictionally upon said fastener by acting upon said collar member.

* * * * *

UNITED STATES PATENT AND TRADEMARK OFFICE
CERTIFICATE OF CORRECTION

PATENT NO. : 4,732,517

DATED : March 22, 1988

INVENTOR(S) : Jack S. Crouch and Edward F. Zink

It is certified that error appears in the above-identified patent and that said Letters Patent is hereby corrected as shown below:

Column 2, line 19: Delete "shileded" and insert -- shielded --.

Column 5, line 30: Delete "it" and insert -- its --.

Column 5, line 64: Delete "Pa" and insert -- PA --.

Column 7, line 26: Delete "At" and insert -- As --.

Column 9, line 61: Delete "of" and insert -- or --.

Signed and Sealed this

Thirteenth Day of March, 1990

Attest:

JEFFREY M. SAMUELS

Attesting Officer

Acting Commissioner of Patents and Trademarks